United States Patent [19]

Vayda

[11] Patent Number: 6,051,049
[45] Date of Patent: Apr. 18, 2000

[54] UTILIZATION OF STRONTIUM ALUMINATE IN STEELMAKING

[75] Inventor: Pierre Vayda, Burlington, Canada

[73] Assignee: Exothermic Distribution Corporation, Ontario, Canada

[21] Appl. No.: 09/084,962

[22] Filed: May 27, 1998

Related U.S. Application Data

[60] Provisional application No. 60/047,893, May 29, 1997.

[51] Int. Cl.[7] ........................................... C22B 5/20
[52] U.S. Cl. ................... 75/714; 75/329; 75/570; 75/684
[58] Field of Search ............................. 75/329, 414, 570, 75/684

[56] References Cited

U.S. PATENT DOCUMENTS

| | | | |
|---|---|---|---|
| 3,867,133 | 2/1975 | Naguro et al. | 75/570 |
| 4,853,034 | 8/1989 | Quigley | 75/570 |
| 5,106,412 | 4/1992 | Bogan et al. | 75/570 |
| 5,407,459 | 4/1995 | Breault et al. | 75/570 |

FOREIGN PATENT DOCUMENTS

| | | |
|---|---|---|
| 72871 | 3/1983 | European Pat. Off. . |
| 0114415 | 9/1979 | Japan ........................................ 75/570 |

OTHER PUBLICATIONS

Derwent Publication 1999–229924, Vayda, P. "Strontium Aluminate Used in Steelmaking.", May 1999.

*Primary Examiner*—Prince Willis, Jr.
*Assistant Examiner*—Tima McGuthry-Banks
*Attorney, Agent, or Firm*—Shoemaker and Mattare, Ltd.

[57] ABSTRACT

Novel utilizations of strontium aluminate, a by-product of the manufacture of strontium, are disclosed in connection with the art of steelmaking. It is useful as a synthetic slag covering for molten iron or steel, as well as in the foaming slag practice, as a backfilling material for spaces between the safety lining and the working lining of a ladle, as a major component for a blend from which are made pellets or briquettes useful as a slag conditioner, as an additive to calcium aluminate which has the effect of substantially lowering the melting point of calcium aluminate, as a tracer material to determine the source of impurities, and as a binder to recycle metal-containing dust.

17 Claims, No Drawings

UTILIZATION OF STRONTIUM ALUMINATE IN STEELMAKING

This application is directed to an invention disclosed in provisional U.S. patent application No. 60/047,893, May 29, 1997.

This invention relates generally to the art of steelmaking, and has to do particularly with the previously unknown use of strontium aluminate in steelmaking.

BACKGROUND OF THIS INVENTION

The metal strontium is normally obtained by using aluminum to reduce strontium oxide. Prior to the present invention, the by-product of the strontium manufacturing process, strontium aluminate; has been considered to be without any important use, and as a result large quantities of strontium aluminate are stockpiled every year.

Strontium aluminate is a basic, alumina-saturated, highly refractory product. It is not radio-active because it is generated by the reduction of the naturally occurring strontium carbonate. Radio-active strontium oxide is that generated by nuclear fusion.

GENERAL DESCRIPTION OF THIS INVENTION

In accordance with the present invention, it has been found that the strontium aluminate by-product can be used with considerable advantage in various facets of the steelmaking process.

The various facets are as follows:

In accordance with one embodiment, there is provided a method of treating molten metal in a ladle, the method consisting of distributing over the melt surface a material which includes strontium aluminate.

In accordance with another aspect, there is provided, in the handling of molten metal in a ladle which has both a safety lining and a working lining, a method of maintaining the ladle by backfilling any space between the two linings with a material which includes strontium aluminate.

A further aspect of this invention involves the use of the cementitious characteristic of strontium aluminate, acting as a major component of a blend from which are made pellets or briquettes useful as a slag conditioner, particularly in the art of steelmaking.

Another aspect of this invention involves the use of strontium aluminate as a tracer material, in order to determine the source of contamination.

Furthermore, strontium aluminate can be used to briquette metal-containing dust, so that it can be recycled.

Finally, there is provided a method of lowering the melting point of calcium aluminate by from about 50° C. to about 75° C., the method consisting of adding from about 5 to about 15% by weight of strontium aluminate thereto.

DETAILED DESCRIPTION OF THE INVENTION

It has been found that strontium aluminate, either alone or blended with other materials, can be used in ladles and tundishes to provide a protective and insulative synthetic slag covering for molten iron or steel. Not only does the strontium aluminate provide good insulating properties, but it also is neutral to either basic lining or alumina lining, these making up most of the linings currently used for ladles in the art of steelmaking.

In a particular embodiment, the strontium aluminate can be blended with other compounds, particularly silico-aluminate, when the blend is to be used as a slag cover in a ladle or a tundish.

In another aspect, strontium aluminate is useful for maintaining the integrity of a steelmaking ladle which has both a safety lining and a working lining. This method consists of backfilling any space between the two linings with a material which includes strontium aluminate. The backfill material may be either strontium aluminate by itself, or a blend of strontium aluminate with magnesia or alumina.

According to a further embodiment, strontium aluminate can be used as a major component of a blend from which are made pellets or briquettes useful as a slag conditioner, particularly for the art of steelmaking. In one particular example, not to be considered limiting, a blend for pellets or briquettes may contain about 60% by weight of strontium aluminate, about 20% by weight of aluminum granules, and the rest water. The blend of material is placed into appropriate molds, and is allowed to cure at room temperature for about 24 hours. Experiment has indicated that the process just described results in pellets or briquettes with good structural integrity and excellent resistance to crumbling or returning to powder form.

In connection with the use of strontium oxide as a tracer for contamination, the following example can be given:

a) Alumina impurities in cast steel could originate from the refractory, the ladle slag or the tundish slag. By adding strontium aluminate to a suspected source of contamination, for instance the ladle slag, the finding of strontium aluminate in the cast steel will indicate that the alumina contamination comes from the ladle slag;

b) As mentioned it is possible to recycle metal-containing dust (such as electric furnace flue dust which contains a high percentage of iron oxide), so that it can be recycled into the furnace that generated it or to a plasma furnace to recuperate the metals (nickel, copper, chrome). Generally speaking, it is not possible to add fines into a melting furnace, as they tend to be sucked directly into the dust collector system from which they originally came. The only viable method is to bind the dust into a briquette or the like, so that it can be introduced into the melt efficiently. The lining in a furnace is usually basic, made of either magnesia or doloma brick. It can also be made out of alumina brick. It is desirable, of course, to use a binder compatible with the race lining, since this will reduce lining erosion due to the slag formed during a melt. Hence, strontium aluminate becomes an excellent candidate as a binder, since it is basic and saturated with alumina, and will not attack the lining.

The final embodiment involves the lowering of the melting point of calcium aluminate by from about 50° to 75°, the method consisting of adding from about 5% to 15% by weight of strontium aluminate thereto.

While several embodiments of this invention have been described above, it will be evident to those skilled in the art that changes and modifications may be made thereto without departing from the essence of this invention, as set forth in the appended claims.

The embodiments of the invention in which an exclusive property or privilege is claimed are defined as follows:

1. A method of treating molten metal in a ladle, the method consisting of distributing over the surface of the molten metal a material which includes strontium aluminate.

2. The method claimed in claim 1, in which the said material consists substantially solely of strontium aluminate.

3. The method claimed in claim 2, in which the molten metal is selected from the group consisting of: iron; steel; aluminum.

4. The method claimed in claim 1, in which the molten metal is selected from the group consisting of: iron; steel; aluminum.

5. The method claimed in claim 1, in which the said material is a blend which includes strontium aluminate.

6. The method claimed in claim 5, in which the molten metal is selected from the group consisting of: iron; steel; aluminum.

7. The method claimed in claim 5, in which said blend also contains silico-aluminate.

8. In the handling of molten metal in a ladle which has both a safety lining and a working lining, a method of maintaining the ladle by backfilling any space between the two linings with a material which includes strontium aluminate.

9. The method claimed in claim 8, in which the said material consists substantially solely of strontium aluminate.

10. The method claimed in claim 9, in which the molten metal is selected from the group consisting of: iron; steel; aluminum.

11. The method claimed in claim 8, in which the molten metal is selected from the group consisting of: iron; steel; aluminum.

12. The method claimed in claim 8, in which the said material is a blend which includes strontium aluminate.

13. The method claimed in claim 12, in which the molten metal is selected from the group consisting of: iron; steel; aluminum.

14. The method claimed in claim 12, in which said blend also contains magnesia and/or alumina.

15. A method of making pellets or briquettes useful as a slag conditioner in steelmaking, said method comprising a step of forming said pellets or briquettes from a starter blend comprising strontium aluminate as a majority component.

16. The method claimed in claim 15, in which the blend contains about 60% by weight of strontium aluminate, about 20% by weight of aluminium granules, and the rest water; the method further including placing the blend into appropriate molds, and allowing the blend to cure at room temperature for about 24 hours.

17. A method of lowering the melting point of calcium aluminate by from about 50° C. to about 75° C. the method comprising a step of adding from about 5% to about 15% by weight of strontium aluminate to said calcium aluminate.

* * * * *